US012810171B2

(12) United States Patent
Huh et al.

(10) Patent No.: US 12,810,171 B2
(45) Date of Patent: Nov. 24, 2026

(54) METHOD AND APPARATUS FOR LEARNING ACTIVATED NEURONS RESPONSES TRANSFER USING SPARSE ACTIVATION MAPS IN KNOWLEDGE DISTILLATION

(71) Applicant: University-Industry Cooperation Group of Kyung Hee University, Gyeonggi-do (KR)

(72) Inventors: Eui Nam Huh, Gyeonggi-do (KR); Hyeon Ki Jo, Gyeonggi-do (KR); Sharmen Akhter, Gyeonggi-do (KR); Md Imtiaz Hossain, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 474 days.

(21) Appl. No.: 18/539,431

(22) Filed: Dec. 14, 2023

(65) Prior Publication Data

US 2024/0242086 A1 Jul. 18, 2024

(30) Foreign Application Priority Data

Mar. 27, 2023 (KR) ........................ 10-2023-0039977

(51) Int. Cl.
*G06N 3/096* (2023.01)
*G06N 3/045* (2023.01)
*G06N 3/048* (2023.01)

(52) U.S. Cl.
CPC ............. *G06N 3/096* (2023.01); *G06N 3/045* (2023.01); *G06N 3/048* (2023.01)

(58) Field of Classification Search
CPC ........ G06N 3/096; G06N 3/045; G06N 3/048; G06N 3/0464; G06N 3/0495
See application file for complete search history.

(56) References Cited

U.S. PATENT DOCUMENTS 11,030,528 B1 6/2021 Zhuo et al.
2020/0250542 A1 8/2020 Li et al.
(Continued)

FOREIGN PATENT DOCUMENTS

JP 2019-514107 A 5/2019
KR 10-2019-0138438 A 12/2019
(Continued)

OTHER PUBLICATIONS

Li, Xingjian, et al. "Knowledge distillation with attention for deep transfer learning of convolutional networks." ACM Transactions on Knowledge Discovery from Data (TKDD) 16.3 (2021): 1-20. https://dl.acm.org/doi/pdf/10.1145/3473912 (Year: 2021) (Year: 2021).*
(Continued)

*Primary Examiner* — Michael H Hoang
(74) *Attorney, Agent, or Firm* — The PL Law Group, PLLC

(57) ABSTRACT

The method for learning activated neurons responses transfer using sparse activation maps (SAMs) in knowledge distillation according to an embodiment is performed on a computing device including one or more processors and a memory that stores one or more programs executed by the one or more processors. The method includes extracting teacher SAMs by extracting a feature map from a learning model of the teacher network based on input data and filtering the extracted feature map, extracting student SAMs by extracting a feature map from a learning model of the student network based on the input data and filtering the extracted feature map, computing a loss function by comparing the extracted teacher SAMs with the extracted student SAMs, and updating the learning model of the student network based on the computed loss function.

14 Claims, 7 Drawing Sheets

(56) References Cited

U.S. PATENT DOCUMENTS

| | | | | |
|---|---|---|---|---|
| 2021/0150345 | A1 | 5/2021 | Abati et al. | |
| 2022/0036194 | A1 | 2/2022 | Sundaresan et al. | |
| 2022/0076129 | A1 | 3/2022 | Kasioumis et al. | |
| 2022/0318633 | A1 | 10/2022 | Kim et al. | |
| 2023/0010142 | A1 | 1/2023 | Zafrir et al. | |
| 2026/0004138 | A1* | 1/2026 | Han | G06N 3/09 |

FOREIGN PATENT DOCUMENTS

| | | | |
|---|---|---|---|
| KR | 10-2020-0052201 | A | 5/2020 |
| KR | 10-2232138 | B1 | 3/2021 |
| KR | 10-2021-0135053 | A | 11/2021 |
| KR | 10-2022-0008135 | A | 1/2022 |
| KR | 10-2022-0087045 | A | 6/2022 |
| KR | 10-2022-0096099 | A | 7/2022 |

OTHER PUBLICATIONS

Office action issued on Nov. 26, 2025 from Korean Patent Office in a counterpart Korean Patent Application No. 10-2023-0039977 (English translation is also submitted herewith.).

Heo, Byeongho et al. ,"Knowledge Transfer via Distillation of Activation Boundaries Formed by Hidden Neurons", 2018, (arXiv:1811.03233v2).

Paschalis Bizopoulos et al., "Sparsely Activated Networks", IEEE transactions on neural networks and learning systems, 2021, vol. 32, No. 3, pp. 1304-1313.

Notice of Allowance issued on Jul. 13, 2026 from Korean Patent Office in a counterpart Korean Patent Application No. 10-2023-0039977 (English translation is also submitted herewith.).

* cited by examiner

METHOD AND APPARATUS FOR LEARNING ACTIVATED NEURONS RESPONSES TRANSFER USING SPARSE ACTIVATION MAPS IN KNOWLEDGE DISTILLATION

CROSS-REFERENCE TO RELATED APPLICATION AND CLAIM OF PRIORITY

This application claims the benefit under 35 USC § 119 of Korean Patent Application Nos. 10-2023-0004776, filed on Jan. 12, 2023, and 10-2023-0039977, filed on Mar. 27, 2023, in the Korean Intellectual Property Office, the entire disclosure of which are incorporated herein by reference for all purposes.

BACKGROUND

1. Field

Embodiments of the present disclosure relate to a technique for learning activated neurons responses transfer using sparse activation maps (SAMs) in knowledge distillation.

2. Description of Related Art

A heavy and complex deep learning architecture consumes high computational resources and a lot of energy. Such a deep learning architecture is not suitable for deployment in environments requiring low computational resources and real-time applications (e.g., 6G network, mobile, IoT, AI-enabled edge, cloud and fog computing infrastructure). A lightweight artificial intelligence (AI) system is needed in order to support a real-time service on a low-performance device.

However, a lightweight deep learning architecture performs worse than the heavy and complex deep learning architecture because the lightweight deep learning architecture lacks generalization ability (ability to use real data rather than training data).

In order to solve this problem, a lightweight deep learning architecture is needed that shows the best performance on devices with fewer computational resources.

SUMMARY

Embodiments of the present disclosure are intended to provide a learning method for transferring activated neuron responses so that a student network has the same neuron activation boundaries as a teacher network based on a loss function computed by comparing a learning model of the teacher network and a learning model of the student network.

According to an exemplary embodiment of the present disclosure, there is provided a method for learning activated neurons responses transfer using sparse activation maps (SAMs) in knowledge distillation performed on a computing device including one or more processors and a memory that stores one or more programs executed by the one or more processors, the method including extracting teacher sparse activation maps (SAMs) by extracting a feature map from a learning model of the teacher network based on input data and filtering the extracted feature map, extracting student sparse activation maps (SAMs) by extracting a feature map from a learning model of the student network based on the input data and filtering the extracted feature map, computing a loss function by comparing the extracted teacher sparse activation maps with the extracted student sparse activation maps, and updating the learning model of the student network based on the computed loss function.

The extracting of the teacher sparse activation maps may further include extracting the feature map using a convolution layer from the learning model of the teacher network based on the input data, extracting an activation map by filtering the extracted feature map using an activation function, and extracting the teacher sparse activation maps by filtering the extracted activation map using a filter function.

The extracting of the teacher sparse activation maps may further include normalizing the activation map extracted from the learning model of the teacher network to a preset range, and re-filtering the normalized activation map through the activation function.

The extracting of the student sparse activation maps may further include extracting the feature map using a convolution layer from the learning model of the student network based on the input data, extracting an activation map by filtering the extracted feature map using an activation function, and extracting the student sparse activation map by filtering the extracted activation map using a filter function.

The extracting of the student sparse activation maps may further include normalizing the activation map extracted from the learning model of the student network to a preset range, and re-filtering the normalized activation map through the activation function.

The activation function may be a rectified linear unit (ReLU) function, and the filter function may be a function obtained by moving the coordinates of the ReLU function and adjusting a passband.

The loss function may be a loss function obtained by comparing losses due to differences in distance between the extracted teacher sparse activation map and the extracted student sparse activation map.

The loss function may be calculated by Equation 2 below.

$$\mathcal{L}_{res}(\mathcal{S}^S, \mathcal{S}^T) = \sum_{i=1}^{L} \left\| (\mathcal{S}_i^S - \mathcal{S}_i^T) \right\|_2^2 \quad \text{[Equation 2]}$$

(where $L_{res}(\bullet)$ is the loss function, $S^S$ is the sparse activation maps of the trained model of the teacher network, $S^T$ is the sparse activation maps of the trained model of the student network, L is the number of SAMs).

DETAILED DESCRIPTION

Figure 1:
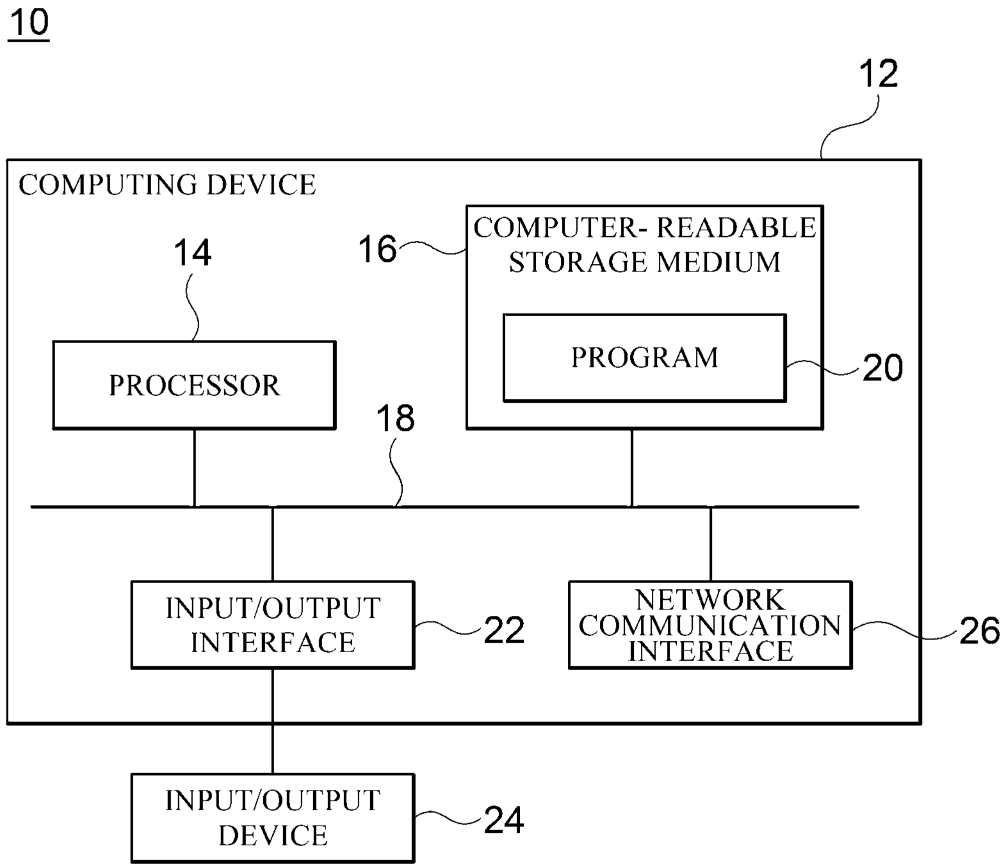
FIG. 1 is a block diagram for illustratively describing a computing environment including a computing device suitable for use in exemplary embodiments.

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, "transfer," "communication," "transmission," "reception," of a signal or information and other terms of similar meaning include not only direct transmission of a signal or information from one component to another component, but also transmission of the signal or information through another component. In particular, "transferring" or "transmitting" a signal or information to a component indicates a final destination of the signal or information and does not mean a direct destination. This is the same for "receiving" the signal or information. In addition, in this specification, the fact that two or more pieces of data or information are "related" means that if one data (or information) is acquired, at least part of the other data (or information) can be acquired based on it.

Meanwhile, embodiments of the present disclosure may include a program for performing the methods described in this specification on a computer, and a computer-readable recording medium containing the program. The computer-readable recording medium may include program instructions, local data files, local data structures, etc., singly or in combination. The media may be those specifically designed and constructed for the present disclosure, or may be those commonly available in the computer software field. Examples of the computer-readable recording medium include a hard disk, a magnetic medium such as a floppy disk and a magnetic tape, an optical recording medium such as CD-ROM and DVD, and a hardware device specially configured to store and perform program instructions, such as ROM, RAM, flash memory, etc. Examples of the program may include not only machine language code such as that generated by a compiler, but also high-level language code that can be executed by the computer using an interpreter, etc.

FIG. 1 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be a device for performing learning of activated neuron responses transfer using SAMs in knowledge distillation according to an embodiment of the present disclosure.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

Figure 2:
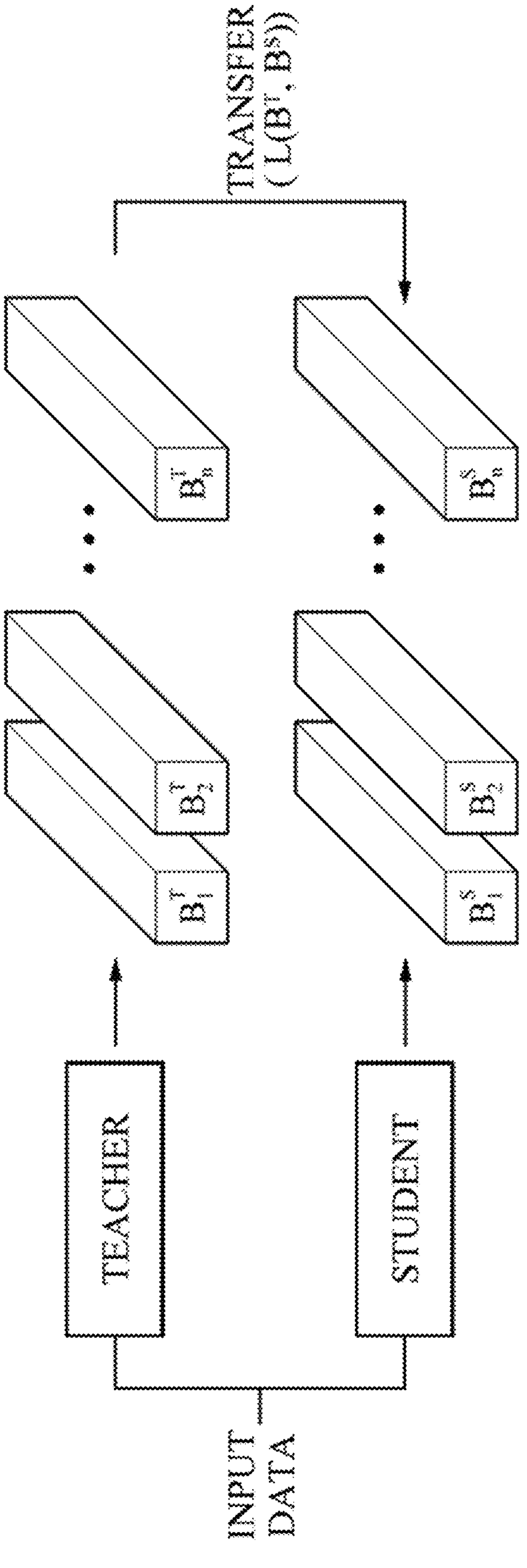
FIG. 2 is a block diagram illustrating a learning model of a general knowledge distillation-based teacher-student network.

FIG. 2 is a block diagram illustrating a learning model of a general knowledge distillation-based teacher-student network.

As illustrated in FIG. 2, the learning model of a knowledge distillation-based teacher-student network includes a teacher network and a student network. Each network is composed of a neural network in which artificial neurons are connected into a network. In this knowledge distillation-based teacher-student network, as each block of the teacher network is related and each block of the student network is related, a knowledge transfer for all related blocks occurs, and a loss function is also determined for all blocks.

Typically, the teacher network refers to a network that has already performed similar prior learning or a more extensive network, and has a larger size than the student network. Here, the network having the larger size means a network having more layers, kernels, and nodes, or a network composed of such combinations thereof. In addition, the student network follows the learning model extracted from the teacher network, and has network components similar to but smaller in size than those of the teacher network.

One of the important technical features of the present disclosure is that the student network learns activation boundaries of the teacher network. The present disclosure can provide a learning method for transferring activated neuron responses so that a student network has the same neuron activation boundaries as a teacher network based on a loss function computed by comparing a learning model of the teacher network and a learning model of the student network. That is, the present disclosure can improve the nonlinearity of the student network, enhance generalization ability of the student network, and generate a learning model with performance close to that of the teacher network, through the learning method for transferring activated neuron responses.

Figure 3:
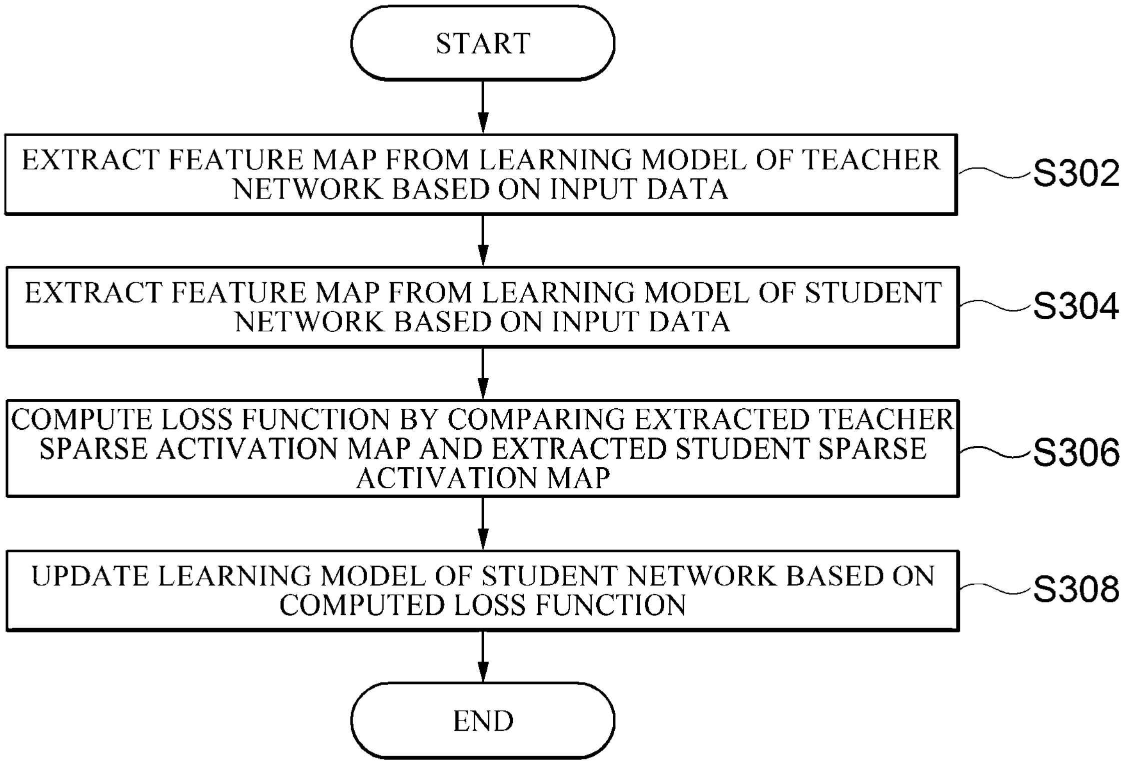
FIG. 3 is a flowchart illustrating a method for learning activated neurons responses transfer using SAMs in knowledge distillation according to an embodiment of the present disclosure.

FIG. 3 is a flowchart illustrating a method for learning activated neurons responses transfer using SAMs in knowledge distillation according to an embodiment of the present disclosure. As described above, the method for learning activated neurons responses transfer using SAMs in knowledge distillation according to an embodiment of the present disclosure may be performed in a computing device 12 including one or more processors and a memory that stores one or more programs to be executed by the one or more processors. To this end, the method for learning activated neurons responses transfer using SAMs in knowledge distillation may be implemented in the form of a program or software including one or more computer-executable instructions and stored on the memory.

In addition, in the illustrated flow chart, the method is described by being divided into a plurality of steps, but at least some of the steps may be performed in a different order, may be performed together in combination with other steps, omitted, may be performed by being divided into detailed steps, or may be performed by being added with one or more steps (not illustrated).

At step 302, the computing device 12 extracts a feature map from the learning model of the teacher network based on input data, filters the extracted feature map, and extracts teacher sparse activation maps (sparse activation maps (SAMs) extracted from the learning model of the teacher network).

In an exemplary embodiment, the computing device 12 may extract the feature map using a convolution layer in the learning model of the teacher network based on the input data. In addition, the computing device 12 may extract an activation map from the extracted feature map using an activation function and extract sparse activation maps from the extracted activation map using a filter function.

In this case, the activation function may be a rectified linear unit (ReLU) function. The ReLU function is a function that outputs (filters) 0 if the input value is less than 0, and outputs the input value as is if the input value is greater than 0. In the present disclosure, the activation map, which is a matrix in which values less than 0 are set to 0 (deactivated) and values greater than 0 are left as is (activated), may be obtained from the feature map.

In addition, the filter function is a function obtained by moving and resizing the ReLU function. In the present disclosure, the sparse activation map, which is a matrix in which values (low activation values) smaller than a preset value are filtered out and only values (higher activation values) larger than the preset value are left, may be obtained from the activation map.

Figure 4A:
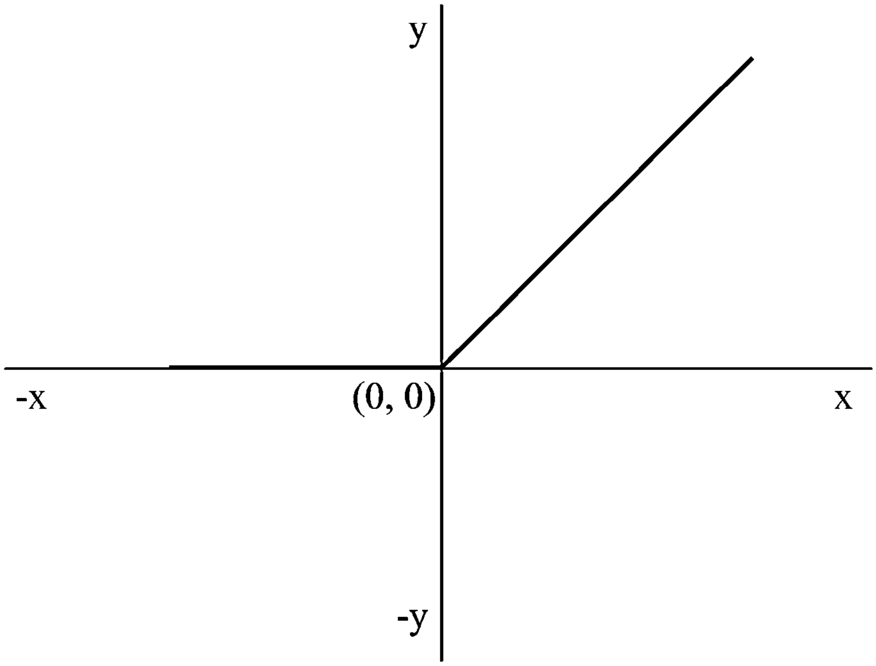
FIGS. 4A and 4B are a diagram for describing an activation function and a filter function according to an embodiment of the present disclosure.
Figure 4B:
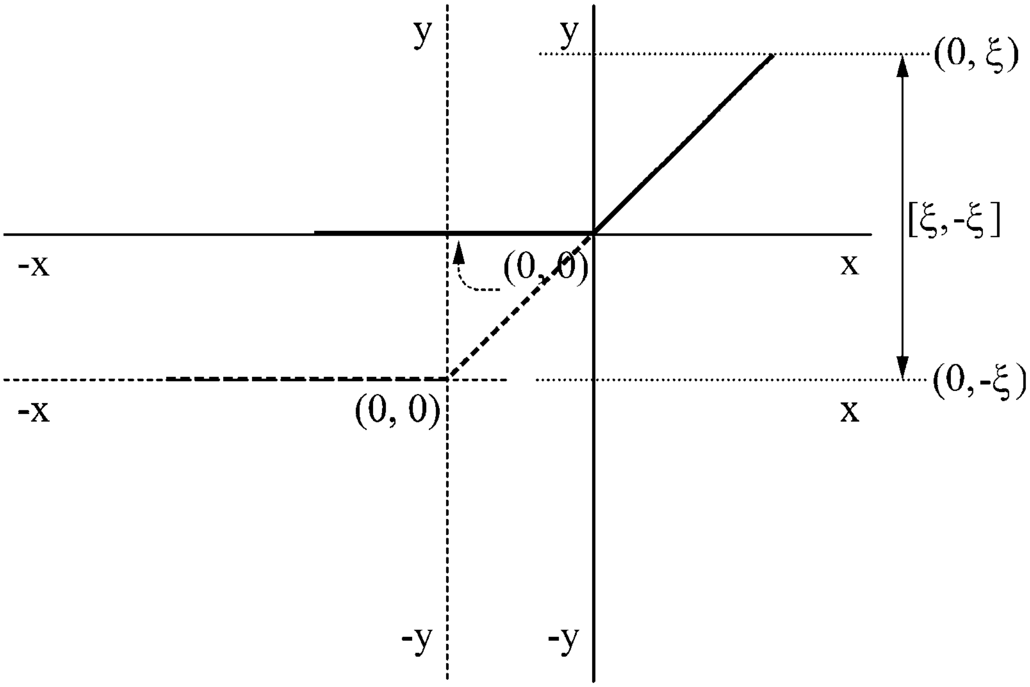
Figure 5:
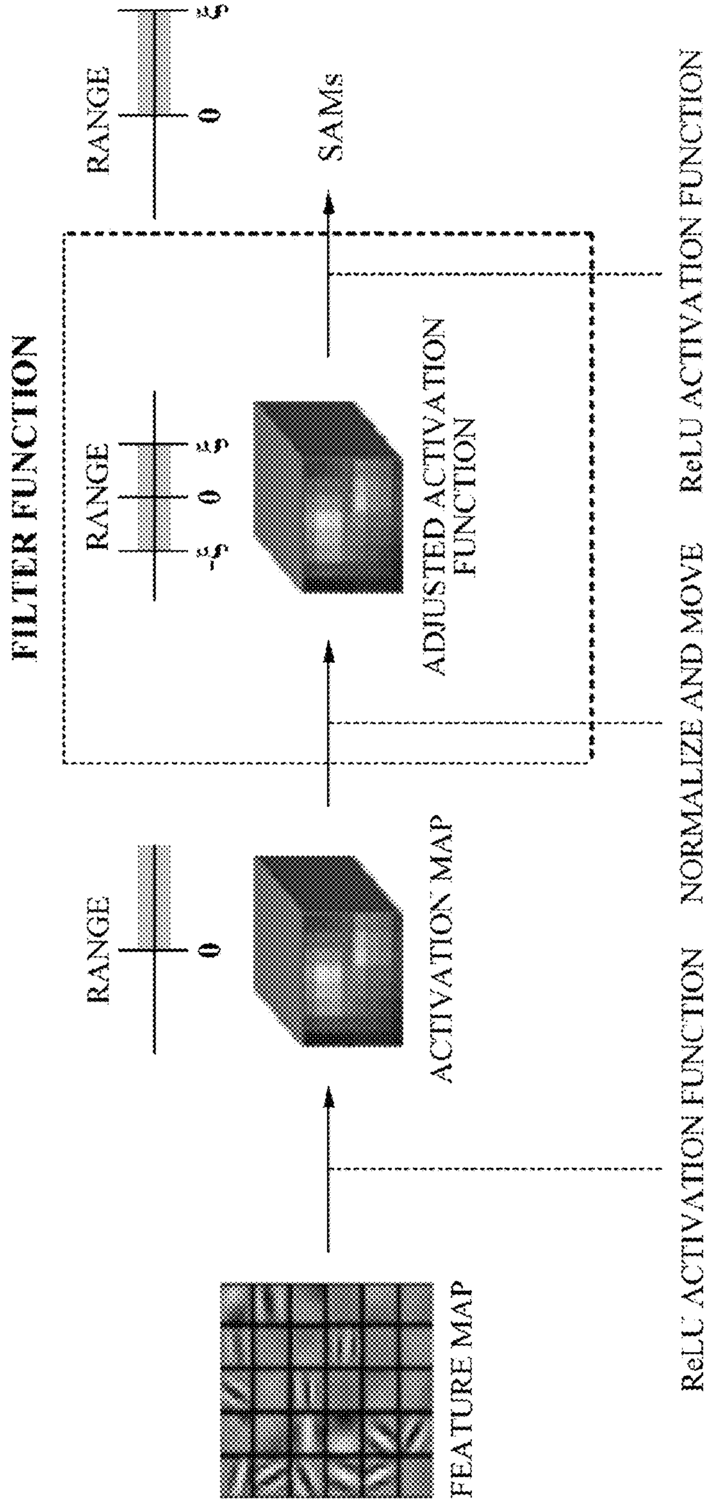
FIG. 5 is a diagram illustrating a process of extracting sparse activation maps (SAMs) according to an embodiment of the present disclosure.

FIGS. 4A and 4B are a diagram for describing the activation function and the filter function according to an embodiment of the present disclosure, and FIG. 5 is a diagram illustrating a process of extracting the sparse activation maps (SAMs) according to an embodiment of the present disclosure.

Referring to FIGS. 4A and 4B, the activation function (FIG. 4A) is the ReLU function, and the filter function (FIG. 4B) is a function obtained by moving (coordinates) and adjusting (range or passband) the RuLU function.

As illustrated in FIG. 5, in the present disclosure, the activation map is extracted by filtering the feature map through the activation function, the extracted activation map is normalized to a range [−ξ, ξ] and the activation map is re-filtered through the activation function, thereby capable of extracting the sparse activation maps (SAMs). Here, ξ may be a temperature for adjusting a range of a separating hyperplane. For example, when ξ=20, the best performance may be achieved.

That is, it is possible to generate an activation map having activated neurons (of which input value is greater than or equal to 0) by filtering and excluding deactivated neurons (of which input value is less than 0) from the feature map through the activation function. In this case, the activation map includes neurons activated with a low value (activation value lower than the preset value) and neurons activated with a high value (activation value higher than the preset value). Accordingly, the sparse activation maps containing only neurons activated with the high value can be generated by filtering out and excluding the neurons activated with the low value through the filter function from the activation map. Through this, the nonlinearity of the student network can be improved by transferring highly activated neuron responses.

In this case, the sparse activation maps can be defined as Equation 1 below.

$$S_{i,j,k} = \varphi(A_{i,j,k}) = \phi\left(\frac{A_{i,j,k}}{\xi \times \|A\|}\right)\Bigg|_{i=0,j=0,k=0}^{i=C,j=H,k=W} \qquad \text{[Equation 1]}$$

(where S is sparse activation maps, A is the activation map, ξ is a range adjustment value, ϕ(•) is the activation function, φ(•) is the filter function, and the subscripts i, j, k are a three-dimensional array (feature map and activation map are made up of three-dimensional matrices), W is the width, H is the height, and C is the channel)

At step 304, the computing device 12 extracts the feature map from the learning model of the student network based on the input data, filters the extracted feature map, and extracts the student sparse activation maps (sparse activation maps (SAMs) extracted from the learned model of the student network). Here, the process of extracting the student sparse activation maps from the learning model of the student network is the same as the process of extracting the teacher sparse activation maps from the learning model of the teacher network.

At step 306, the computing device 12 computes a loss function ($L_{res}(S^S, S^T)$) by comparing the extracted teacher sparse activation maps and the extracted student sparse activation maps. Here, $S^S$ may refer to the sparse activation maps of the learned model of the teacher network, $S^T$ may refer to the sparse activation maps of the learned model of the student network, and $L_{res}(S^S, S^T)$ may refer to the loss function obtained by comparing the two sparse activation maps.

In an exemplary embodiment, the loss function may be computed by using a distance difference between the sparse activation map of the trained model in the teacher network and the sparse activation map of the trained model in the student network.

The loss function may be calculated by Equation 2 below.

$$\mathcal{L}_{res}(S^S, S^T) = \sum_{i=1}^{L} \|(S_i^S - S_i^T)\|_2^2 \quad \text{[Equation 2]}$$

(where $L_{res}(\bullet)$ is the loss function, $S^S$ is the sparse activation maps of the learned model of the teacher network, $S^T$ is the sparse activation maps of the learned model of the student network, L is the number of SAMs)

Here, the loss function is calculated by calculating a distance using the L2-Norm method, and can be calculated by adding up the squares of the difference (distance) between the teacher sparse activation map and the student sparse activation map when i is from 1 to L.

Figure 6:
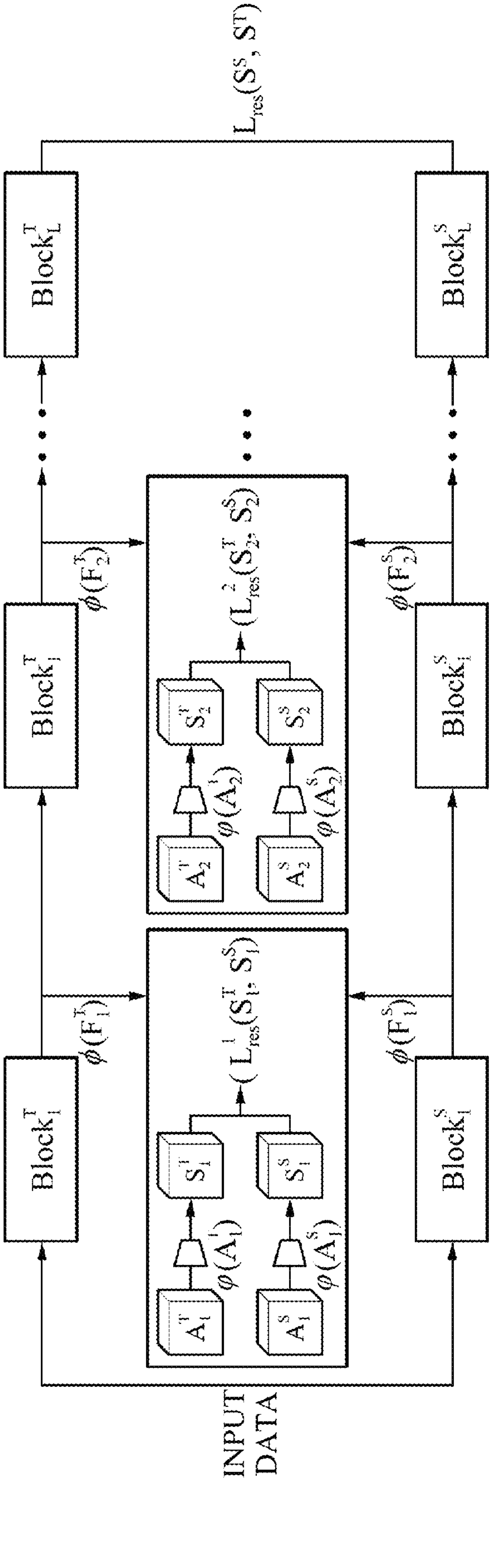
FIG. 6 is a diagram illustrating a process of computing a loss function using the sparse activation maps (SAMs) of a learning model extracted from the teacher network and sparse activation maps of a learning model extracted from the student network according to an embodiment of the present disclosure.

FIG. 6 is a diagram illustrating a process of computing a loss function using the sparse activation maps (SAMs) of the learning model extracted from the teacher network and the sparse activation maps of the learning model extracted from the student network according to an embodiment of the present disclosure.

As illustrated in FIG. 6, the loss function of the entire network can be calculated using the loss function obtained by comparing the sparse activation maps for each block (in this case, the number of blocks is L). That is, the computing device 12 may extract the activation maps $$(A_L^T, A_L^S)$$

from the feature maps $$(F_L^T, F_L^S)$$

output for each block of the learning model of the teacher network and the student network through the activation function $\phi(\bullet)$, and may extract the sparse activation maps $$(S_L^T, S_L^S)$$

from the extracted activation maps through the filter function $\varphi(\bullet)$. In addition, the computing device 12 may calculate the loss function $L_{res}$ $(S^S, S^T)$ by comparing the sparse activation maps $$S_L^T$$

extracted from the learning model of the teacher network and the sparse activation maps $$S_L^S$$

extracted from the learning model of the student network.

At step 308, the computing device 12 updates the learning model of the student network based on the computed loss function.

That is, the computing device 12 can update the learning model of the student network through weights that minimize the computed loss function. In this way, training can be repeated until the learning model of the learning network has the same neuron activation boundaries as the learning model of the teacher network.

Therefore, the method for learning activated neurons responses transfer using SAMs in knowledge distillation according to an embodiment of the present disclosure can improve the nonlinearity of the student network, enhances the generalization ability thereof, and generate the learning model with performance close to that of the teacher network, through the learning method for transferring the activated neuron responses.

Meanwhile, in the method for learning activated neurons responses transfer using sparse activation maps in knowledge distillation according to an embodiment of the present disclosure, the learning model of the student network can be trained by using not only input data but also augmented data. Here, augmented data can be generated by transforming input data. In addition, in the method for learning activated neurons responses transfer using sparse activation maps in knowledge distillation, a teacher assistance network and a student assistance network for learning augmented data may be further included.

The computing device 12 can train the learning model of the teacher network based on the input data and train the learning model of the teacher assistant network based on the augmented data.

In addition, the computing device 12 can train the learning model of the student network based on the input data and train the learning model of the student assistant network based on the augmented data.

In addition, the computing device 12 can update the student network using the loss of knowledge distillation between the teacher network and the student network, cross-entropy loss between predicted values and actual values, loss of knowledge distillation between teacher assistant networks and student assistant networks, and loss between the sparse activation maps of the teacher network and the sparse activation maps of the student network.

That is, the overall loss function can be calculated by Equation 3 below.

$$\mathcal{L}_{NeuRes} = \beta_1\mathcal{L}_{kd} + \beta_2\mathcal{L}_{ce} + \mathcal{L}_{ax-st} + \mathcal{L}_{res} \quad \text{[Equation 3]}$$

Here, $L_{kd}$ is the loss of knowledge distillation between teacher network and student network, $L_{ce}$ is the cross-entropy loss between predicted and actual values, $L_{ax\text{-}st}$ is the loss of knowledge distillation between teacher assistant networks and student assistant networks, $L_{res}$ is the loss between the sparse activation map of the teacher network and the sparse activation map of the student network, and β1 and β2 are balancing hyperparameters.

According to embodiments of the present disclosure, through the learning method for transferring activated neuron responses, it is possible to improve the nonlinearity of the student network, enhance generalization ability of the student network, and generate a learning model with performance close to that of the teacher network.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A computer-implemented method for training a student network by transferring responses of activated neurons using sparse activation maps (SAMs) in knowledge distillation, the method comprising:

generating teacher SAMs by:

extracting, based on input data, a teacher feature map from a learning model of a teacher network;

generating a teacher activation map by applying a teacher activation function to the teacher feature map; and applying a teacher filter function to the teacher activation map to generate the teacher SAMS;

generating student SAMs by:

extracting, based on the input data, a student feature map from a learning model of the student network;

generating a student activation map by applying a student activation function to the student feature map; and applying a student filter function to the student activation map to generate the student SAMS;

computing a loss function based on differences between the teacher SAMs and the student SAMs; and updating weights of the learning model of the student network to minimize the loss function, thereby training the student network to learn neuron activation boundaries of the teacher network, wherein the teacher activation function and the student activation function are respective rectified linear unit (ReLU) functions, wherein each of the teacher filter function and the student filter function is obtained by moving the coordinates of the respective ReLU function and adjusting a passband, and wherein each of the teacher filter function and the student filter function filters out, from the respective activation map, activation values less than a preset activation value and retains activation values greater than the preset activation value to generate the respective SAMs.

2. The method of claim 1, wherein the teacher feature map is extracted using a convolutional layer of the learning model of the teacher network.

3. The method of claim 2, wherein generating the teacher SAMs further comprises:

normalizing the teacher activation map to a preset range; and re-filtering the normalized teacher activation map through the teacher activation function.

4. The method of claim 1, wherein the student feature map is extracted using a convolutional layer of the learning model of the student network.

5. The method of claim 4, wherein generating the student SAMs further comprises:

normalizing the student activation map to a preset range; and re-filtering the normalized student activation map through the student activation function.

6. The method of claim 1, wherein computing the loss function comprises calculating a distance between each teacher SAM and a corresponding student SAM.

7. The method of claim 6, wherein the loss function is calculated by Equation 2:

$$\mathcal{L}_{res}(\mathcal{S}^S, \mathcal{S}^T) = \sum_{i=1}^{L} \|(\mathcal{S}_i^S - \mathcal{S}_i^T)\|_2^2 \quad \text{[Equation 2]}$$

where $L_{res}(\bullet)$ is the loss function, $S^S$ is the sparse activation maps of the trained model of the teacher network, $S^T$ is the sparse activation maps of the trained model of the student network, L is the number of SAMs.

8. A computing device configured to train a student network by transferring responses of activated neurons using sparse activation maps (SAMs) in knowledge distillation, the computing device comprising:

one or more processors;

a memory; and one or more programs stored in the memory and configured to be executed by the one or more processors, wherein the one or more programs include: instructions that, when executed by the one or more processors, cause the computing device to:

generate teacher SAMs by: extracting, based on input data, a teacher feature map from a learning model of a teacher network:

generating a teacher activation map by applying a teacher activation function to the teacher feature map; and applying a teacher filter function to the teacher activation map to generate the teacher SAMs;

generate student SAMs by:

extracting, based on the input data, a student feature map from a learning model of the student network;

generating a student activation map by applying a student activation function to the student feature map; and applying a student filter function to the student activation map to generate the student SAMs;

compute a loss function based on differences between the teacher SAMs and the student SAMs; and update weights of the learning model of the student network to minimize the loss function, thereby training the student network to learn neuron activation boundaries of the teacher network, wherein the teacher activation function and the student activation function are respective rectified linear unit (ReLU) functions, wherein each of the teacher filter function and the student filter function is obtained by moving the coordinates of the respective ReLU function and adjusting a passband, and wherein each of the teacher filter function and the student filter function filters out, from the respective activation map, activation values less than a preset activation value and retains activation values greater than the preset activation value to generate the respective SAMs.

9. The computing device of claim 8, wherein the instructions cause the computing device to extract the teacher feature map using a convolutional layer of the learning model of the teacher network.

10. The computing device of claim 9, wherein the instructions further cause the computing device to:

normalize the teacher activation map to a preset range; and re-filter the normalized teacher activation map through the teacher activation function.

11. The computing device of claim 8, wherein the instructions cause the computing device to extract the student feature map using a convolutional layer of the learning model of the student network.

12. The computing device of claim 11, wherein the instructions further cause the computing device to:

normalize the student activation map to a preset range; and re-filter the normalized student activation map through the student activation function.

13. The computing device of claim 8, wherein the instructions cause the computing device to compute the loss function by calculating a distance between each teacher SAM and a corresponding student SAM.

14. The computing device of claim 13, wherein the loss function is calculated by Equation 2:

$$\mathcal{L}_{res}(\mathcal{S}^S, \mathcal{S}^T) = \sum_{i=1}^{L} \|(\mathcal{S}_i^S - \mathcal{S}_i^T)\|_2^2 \quad \text{[Equation 2]}$$

where $L_{res}(\cdot)$ is the loss function, $S^S$ is the sparse activation maps of the trained model of the teacher network, $S^T$ is the sparse activation maps of the trained model of the student network, L is the number of SAMs.

* * * * *